United States Patent
Abdellatif et al.

(10) Patent No.: US 12,447,771 B2
(45) Date of Patent: Oct. 21, 2025

(54) SYSTEM AND METHOD USING ROTATING AIR GAPS TO CONTROL MAGNETIC WHEEL ADHESION

(71) Applicant: Saudi Arabian Oil Company, Dhahran (SA)

(72) Inventors: Fadl Abdellatif, Thuwal (SA); Ahmed Al Brahim, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 783 days.

(21) Appl. No.: 17/662,549

(22) Filed: May 9, 2022

(65) Prior Publication Data
US 2023/0356544 A1 Nov. 9, 2023

(51) Int. Cl.
*B60B 19/00* (2006.01)
*H01F 7/02* (2006.01)
*H01F 7/20* (2006.01)

(52) U.S. Cl.
CPC ............ *B60B 19/006* (2013.01); *H01F 7/02* (2013.01); *H01F 7/20* (2013.01); *B60B 2900/931* (2013.01)

(58) Field of Classification Search
CPC ......... B60B 19/00; B60B 19/006; B60B 3/08; B63B 59/10; H01F 7/02; H01F 7/20
See application file for complete search history.

(56) References Cited

U.S. PATENT DOCUMENTS

| | | | |
|---|---|---|---|
| 3,452,310 A | 6/1969 | Israelson | |
| 3,812,629 A | 5/1974 | Campbell | |
| 4,199,741 A | 4/1980 | Serrus Paulet | |
| 4,465,993 A | 8/1984 | Braillon | |
| 4,616,796 A | 10/1986 | Inoue | |
| 6,125,955 A * | 10/2000 | Zoretich | B60B 19/006 180/7.1 |
| 8,350,663 B1 | 1/2013 | Michael | |
| 8,576,036 B2 | 11/2013 | Fullerton et al. | |
| 11,021,198 B2 | 6/2021 | Carrasco Zanini et al. | |
| 11,097,401 B2 | 8/2021 | Morton et al. | |
| 11,098,854 B2 | 8/2021 | Carrasco Zanini et al. | |
| 11,157,013 B2 | 10/2021 | Loosararian et al. | |
| 2015/0151572 A1* | 6/2015 | Parrott | B60B 19/12 301/5.23 |
| 2017/0166004 A1* | 6/2017 | Parrott | B60B 19/003 |

FOREIGN PATENT DOCUMENTS

| | | | |
|---|---|---|---|
| CA | 3059845 A1 | 4/2020 | |
| GB | 721748 A | 1/1955 | |
| JP | 2011172432 A | 9/2011 | |
| KR | 100892565 B1 | 4/2009 | |
| KR | 101282613 B1 * | 7/2013 | |
| WO | WO-9964127 A1 * | 12/1999 | A63C 17/223 |

OTHER PUBLICATIONS

Andrew Klein; 3D Print a Magnetic Switch, and how it works; https://www.youtube.com/watch?v=n9tZIFfM140>, last visited on Jan. 13, 2022.; Apr. 9, 2019; 4 pages.

* cited by examiner

*Primary Examiner* — Kip T Kotter
(74) *Attorney, Agent, or Firm* — Leason Ellis LLP

(57) ABSTRACT

A system and method control magnetic adhesion of a wheel to a surface using rotating air gaps. First and second discs have apertures. The first disc retains magnets in the apertures. When the apertures of the second disc are not align with the magnets, adhesion is increased. When the apertures of the second disc are aligned with the magnets, air gaps block magnetic flux to decrease the adhesion. A method implements the system.

20 Claims, 4 Drawing Sheets

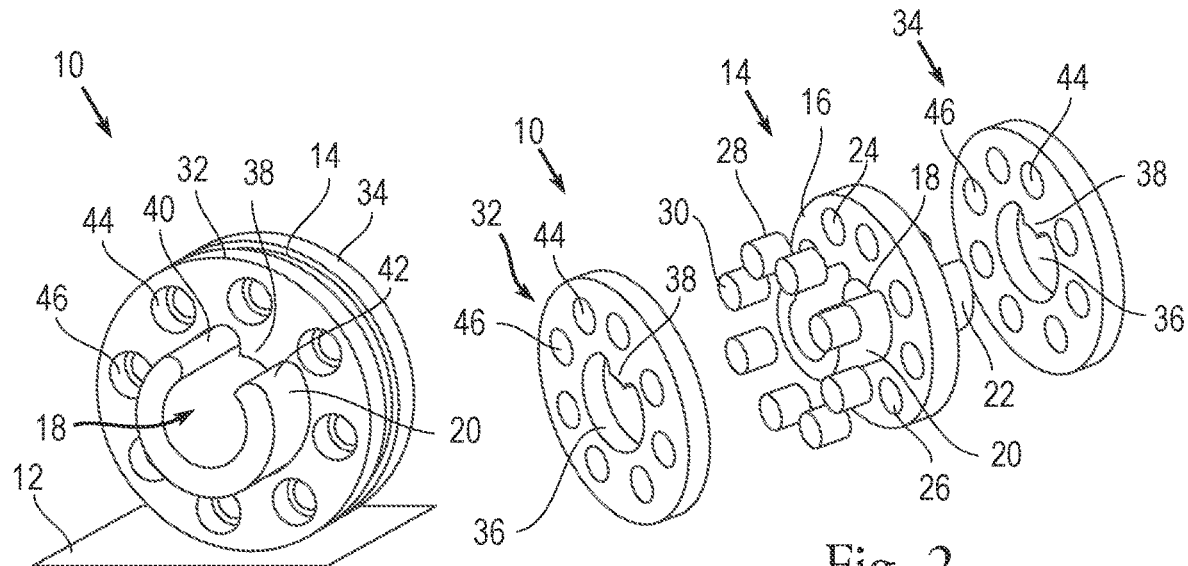
Fig. 1
Fig. 2
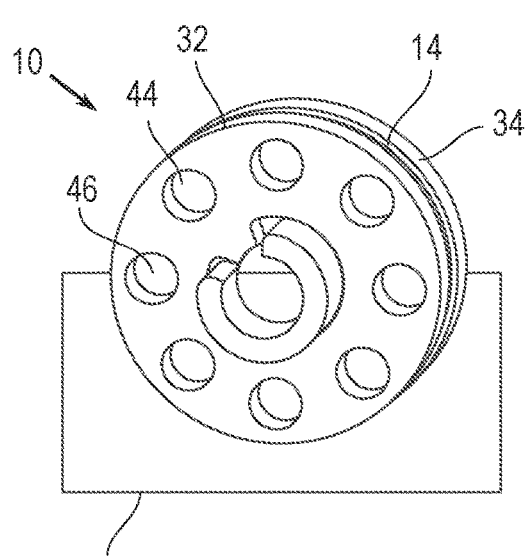
Fig. 3
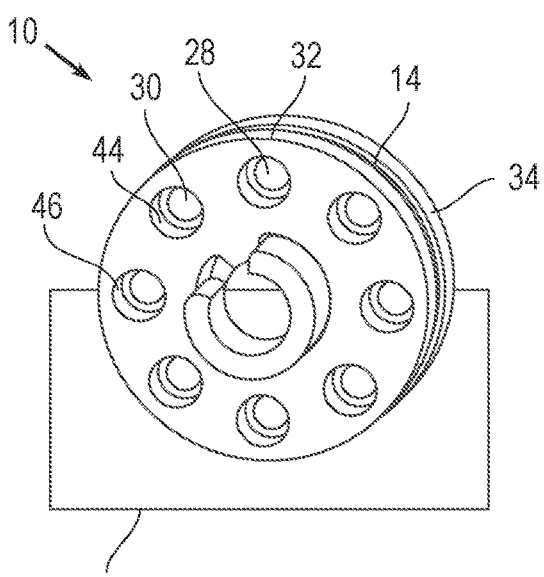
Fig. 4

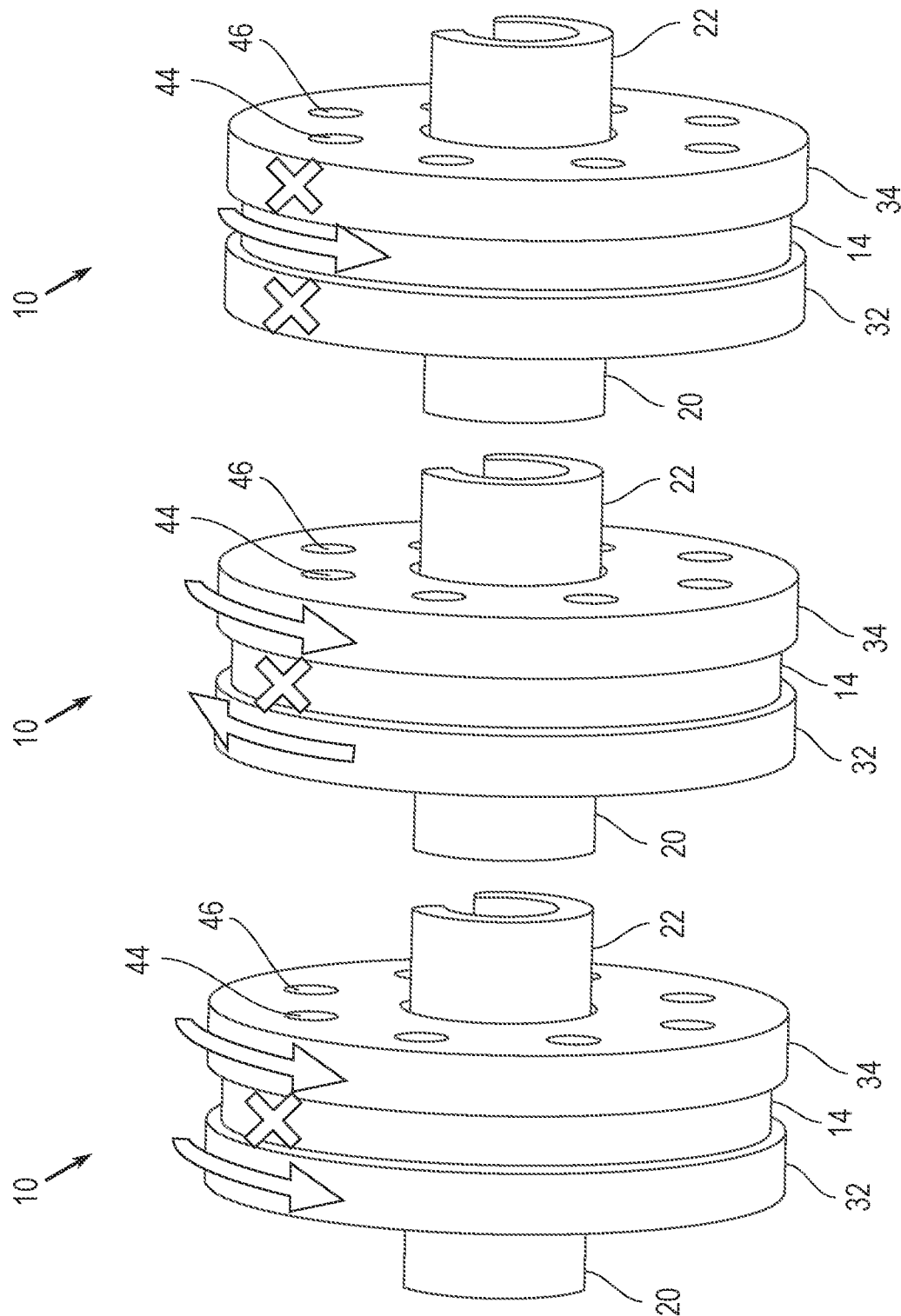

SYSTEM AND METHOD USING ROTATING AIR GAPS TO CONTROL MAGNETIC WHEEL ADHESION

FIELD OF THE DISCLOSURE

The present disclosure relates generally to magnetized wheels, and, more particularly, to a system and method using rotating air gaps to control magnetic adhesion of a wheel to a ferromagnetic surface.

BACKGROUND OF THE DISCLOSURE

Magnetic wheels enable vehicles to climb and drive on ferromagnetic structures. For example, an unmanned aerial vehicle (UAV) can fly to a point on a ferromagnetic structure, perch at that point, and utilize magnetic wheels to adhere to the ferromagnetic structure. The magnetic adhesion is the result of magnetic flux passing through the surface from the magnet north pole to the magnetic south pole of a magnet in the wheel. Having a strong magnetic grip to the ferromagnetic surface is essential to prevent the vehicle from disengaging inadvertently and from falling from the ferromagnetic surface. However, a strong pulling force is required to overcome the magnetic adhesion to disengage the vehicle from the ferromagnetic surface. In order to enable vehicles to obtain a strong magnetic grip as well as easy disengagement, incorporation of a magnetic switch into the wheel is desirable.

SUMMARY OF THE DISCLOSURE

According to an embodiment consistent with the present disclosure, a system and method use rotating air gaps to control magnetic adhesion of a wheel to a ferromagnetic surface.

In an embodiment, a wheel configured to adhere magnetically to a ferromagnetic surface comprises an inner disc and a pair of outer discs. The inner annular disc is composed of a non-magnetic material and has a first plurality of apertures configured to retain a plurality of magnets. The pair of outer annular discs is composed of a ferromagnetic material and is disposed on either side of the inner annular disc, with each outer annular disc having a second plurality of apertures. In a first configuration, the second plurality of apertures are not aligned with the magnets, thereby generating a first magnetic flux between the plurality of magnets and the ferromagnetic surface to increase the adhesion of the wheel to the ferromagnetic surface. In a second configuration, at least one outer annular disc is rotated relative to the inner annular disc to align the second plurality of apertures with the magnets, thereby generating a second magnetic flux between the plurality of magnets and the ferromagnetic surface to decrease the adhesion of the wheel to the ferromagnetic surface. The second magnetic flux is less than the first magnetic flux.

In the second configuration, the alignment of the second plurality of apertures with the magnets forms a plurality of air gaps adjacent to the magnets. The plurality of air gaps block at least a portion of the second magnetic flux. The plurality of magnets can be permanent magnets. Alternatively, the plurality of magnets can be electromagnets. The first and second pluralities of apertures can be cylindrical. The plurality of magnets can be cylindrical.

In another embodiment, a wheel configured to adhere magnetically to a ferromagnetic surface comprises first and second annular discs. The first annular disc is composed of a non-magnetic material and has a first plurality of apertures configured to retain a plurality of magnets. The second annular disc is composed of a ferromagnetic material and is disposed on a side of the first annular disc, with the second annular disc having a second plurality of apertures. In a first configuration, the second plurality of apertures are not aligned with the magnets, thereby generating a first magnetic flux between the plurality of magnets and the ferromagnetic surface to increase the adhesion of the wheel to the ferromagnetic surface. In a second configuration, the second annular disc is rotated relative to the first annular disc to align the second plurality of apertures with the magnets, thereby generating a second magnetic flux between the plurality of magnets and the ferromagnetic surface to decrease the adhesion of the wheel to the ferromagnetic surface. The second magnetic flux is less than the first magnetic flux.

In the second configuration, the alignment of the second plurality of apertures with the magnets forms a plurality of air gaps adjacent to the magnets. The plurality of air gaps block at least a portion of the second magnetic flux. The plurality of magnets can be permanent magnets. Alternatively, the plurality of magnets can be electromagnets. The first and second pluralities of apertures can be cylindrical. The plurality of magnets can be cylindrical.

In a further embodiment, a method of adhering a wheel magnetically to a ferromagnetic surface comprises providing a wheel having a first annular disc and a second annular disc, wherein the first annular disc is composed of a non-magnetic material and has a first plurality of apertures and is configured to retain a first plurality of magnets, and wherein the second annular disc is composed of a ferromagnetic material and is disposed on one side of the first annular disc, with the second annular disc having a second plurality of apertures. The method further comprises disposing the first and second annular discs in a first configuration wherein the second plurality of apertures are not aligned with the magnets, generating a first magnetic flux between the plurality of magnets and the ferromagnetic surface, and increasing the adhesion of the wheel to the ferromagnetic surface.

The method further comprises disposing the first and second annular discs in a second configuration wherein the second plurality of apertures are aligned with the magnets, defining a plurality of air gaps adjacent to the plurality of magnets, generating a second magnetic flux between the plurality of magnets and the ferromagnetic surface, and decreasing the adhesion of the wheel to the ferromagnetic surface, wherein the second magnetic flux is less than the first magnetic flux. The plurality of magnets can be permanent magnets. Alternatively, the plurality of magnets can be electromagnets. The plurality of magnets can be cylindrical. The first and second pluralities of apertures can be cylindrical.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIG. 1 is a diagram of a wheel, according to an embodiment.

FIG. 2 is a diagram of the wheel of FIG. 1 with parts separated.

FIG. 3 is a diagram of the wheel of FIG. 1 in a first configuration.

FIG. 4 is a diagram of the wheel of FIG. 1 in a second configuration.

FIG. 5 illustrates outer discs of the wheel of FIG. 1 rotating in a common direction relative to an inner disc.

FIG. 6 illustrates the outer discs of the wheel of FIG. 1 rotating in opposite directions relative to the inner disc.

FIG. 7 illustrates the inner disc of the wheel of FIG. 1 rotating relative to both of the outer discs.

Figure 8:
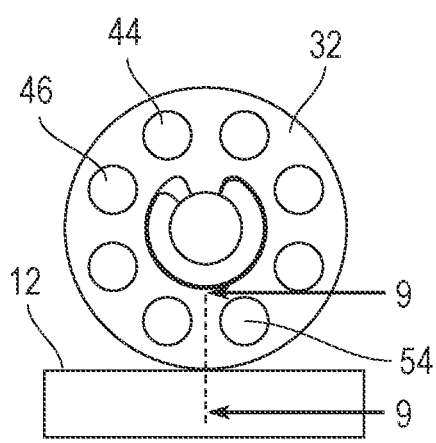
FIG. 8 is a cross-sectional view of the wheel of FIG. 1 in the first configuration.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a system and method using rotating air gaps to control magnetic adhesion of a wheel to a ferromagnetic surface.

Referring to FIGS. 1-13, the wheel 10 is configured to roll on a surface 12. Using the system and method described below, when the surface 12 is ferromagnetic, a magnetic flux generated by the wheel 10 can be controlled to increase or decrease magnetic adhesion of the wheel 10 to the ferromagnetic surface 12. As shown in FIGS. 1-4, the wheel 10 has an inner disc 14 having a pair of planar sides 16. The inner disc 14 is composed of a non-magnetic material. For example, the inner disc 14 can be composed of plastic. The inner disc 14 is generally annular with a central axial bore 18 partially surrounded by a disc retainer 20, 22 extending perpendicularly from at least one of the planar sides 16. The central axial bore 18 is configured to receive an axle to roll the wheel 10 about the axle on the surface 12. A plurality of apertures 24, 26 extend perpendicularly and at least partially into at least one of the planar sides 16. Each of the plurality of apertures 24, 26 receives a respective one of a plurality of magnets 28, 30. The magnets 28, 30 can be permanent magnets. Alternatively, the magnets 28, 30 can be electromagnets. The magnets 28, 30 are sized and dimensioned to be retained in the respective apertures 24, 26. In an example embodiment, the apertures 24, 26 are cylindrical, and the magnets 28, 30 are also cylindrical.

The wheel 10 also has at least one outer disc 32, 34 disposed adjacent to a respective planar side 16 of the inner disc 14. Each outer disc 32, 34 is composed of a ferromagnetic material. For example, each outer disc 32, 34 can be composed of steel. Alternatively, each outer disc 32, 34 can be composed of nickel. In another alternative embodiment, each outer disc 32, 34 can be composed of cobalt. The outer discs 32, 34 can also be composed of other ferromagnetic materials. Each outer disc 32, 34 has a central axial bore 36 configured to receive a respective disc retainer 20, 22 through which an axle passes. The central axial bore 36 of each outer disc 32, 34 has a rotation stopper 38 for engaging radial sides 40, 42 of a respective disc retainer 20, 22. The radial sides 40, 42 limit the rotation of each outer disc 32, 34 relative to the inner disc 14 to a predetermined angle. The predetermined angle is equal to 180°/(the number of magnets of the inner disc). For example, in an embodiment with eight magnets, the predetermined angle can be about 180°/8, which is about 22.5°. Using a different number of outer magnets would change the predetermined angle. For example, for ten outer magnets, the rotation angle can be about 180°/10, which is about 18°. It is also understood that other sizes and dimensions of the outer diameters of the discs as well as the aperture sizes are contemplated.

Referring again to FIGS. 1-4, each outer disc 32, 34 has a plurality of apertures 44, 46. The number of apertures 44, 46 equals the number of apertures 24, 26 which equals the number of magnets 28, 30. For example, as shown in FIGS. 1-4, there are eight magnets 28, 30 regularly spaced about the central axial bore 18, and so there are eight apertures 24, 26 regularly spaced about the central axial bore 18, and there are eight apertures 44, 46 regularly spaced about the central axial bore 36.

As described above, rotation of each outer disc 32, 34 can be performed relative to the inner disc 14 to within a predetermined angle. FIG. 5 illustrates outer discs 32, 34 of the wheel 10 rotating in a common direction relative to the inner disc 14. As shown in FIG. 5, the inner disc 14 can be motionless as the outer discs 32, 34 rotate in a common direction. FIG. 6 illustrates the outer discs 32, 34 of the wheel 10 rotating in opposite directions relative to the inner disc 14. As shown in FIG. 6, the inner disc 14 can be motionless as the outer discs 32, 34 rotate in opposite directions. FIG. 7 illustrates the inner disc 14 of the wheel 10 rotating relative to both of the outer discs 32, 34. As shown in FIG. 7, the inner disc 14 can be rotated as the outer discs 32, 34 remain motionless.

Figure 9:
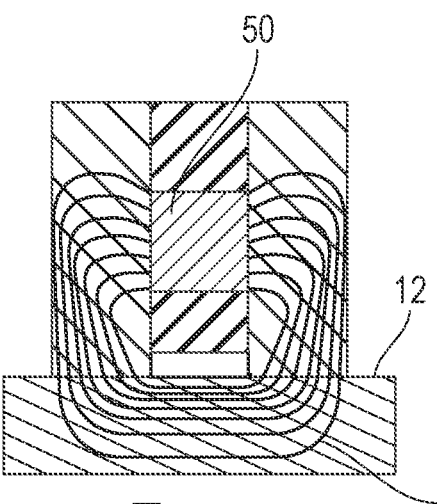
FIG. 9 illustrates the magnetic flux of the wheel in the first configuration of FIG. 8 along lines 9-9.
Figure 10:
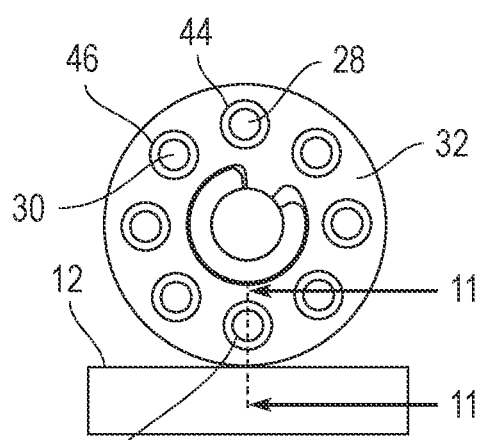
FIG. 10 is a cross-sectional view of the wheel of FIG. 1 in the second configuration.
Figure 11:
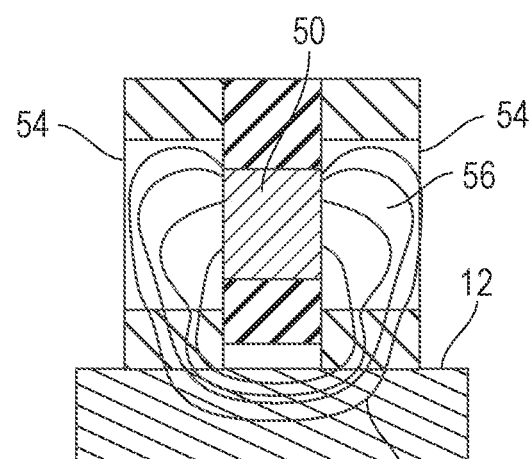
FIG. 11 illustrates the magnetic flux of the wheel in the second configuration of FIG. 10 along lines 11-11.

Regardless of the absolute motion of the inner disc 14 and the outer discs 32, 34, the relative motion of the discs 14, 32, 34 changes the wheel 10 from a first configuration, as shown in FIGS. 3 and 8-9, to a second configuration, as shown in FIGS. 4 and 10-11. In the first configuration, the magnets 28, 30 are not visible through the apertures 44, 46, since the magnets 28, 30 and the apertures 44, 46 are not aligned. Accordingly, there are no air gaps adjacent to the magnets 28, 30. For example, as shown in FIGS. 8-9, a magnet 50 is hidden by the outer disc 32. As shown in FIG. 9, the magnets 28, 30, 50 generate a first magnetic flux 52 between the magnets 28, 30, 50 and the ferromagnetic surface 12 to increase the adhesion of the wheel to the ferromagnetic surface 12.

In the second configuration, at least one outer annular disc 32, 34 is rotated about the axle relative to the inner annular disc 14 to dispose the magnets 28, 30, 50 adjacent to and aligned with the apertures 44, 46, 54. The apertures 44, 46, 54 form an air gap 56 which blocks at least a portion of the magnetic flux from the magnets 28, 30, thereby generating a second magnetic flux 58 between the magnets 28, 30, 50 and the ferromagnetic surface 12 to decrease the adhesion of the wheel 10 to the ferromagnetic surface 12. The second magnetic flux 58 shown in FIG. 11 is less than the first magnetic flux 52 shown in FIG. 9, so there is less adhesion of the wheel 10 to the ferromagnetic surface 12.

Figure 12:
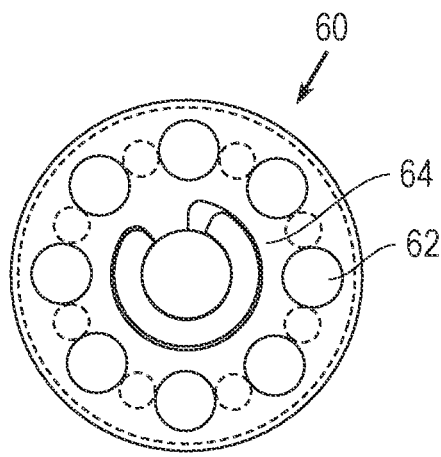
FIG. 12 is a diagram of an alternative embodiment of the outer disc.
Figure 13:
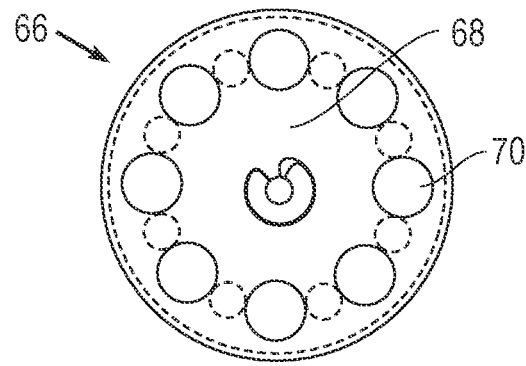
FIG. 13 is a diagram of another alternative embodiment of the outer disc.

Alternative embodiments of the outer discs 32, 34 can be implemented to reduce or eliminate magnetic flux saturation in the outer discs 32, 34. Flux saturation can occur if the medium in which the magnetic flux passes through is very narrow which causes a large magnetic flux density in the material, overwhelming its ability to conduct any further flux. Such a large magnetic flux density can lead to reduction of the overall magnetic grip of the wheel 10 to the ferromagnetic surface 12. Accordingly, ample space is to be provided in the outer discs to conduct the flux into the ferromagnetic surface 12. For example, as shown in FIG. 12, an alternative disc 60 has a smaller amount of material between the apertures 62 and an inner peripheral region 64 surrounding the central axial bore. In another example, as shown in FIG. 13, another alternative disc 66 has a larger amount of material between the inner peripheral region 68 and the apertures 70. Accordingly, the outer discs of the wheel 10 can have enough material to avoid saturation and to obtain the best operating profile of the wheel 10.

Figure 14:
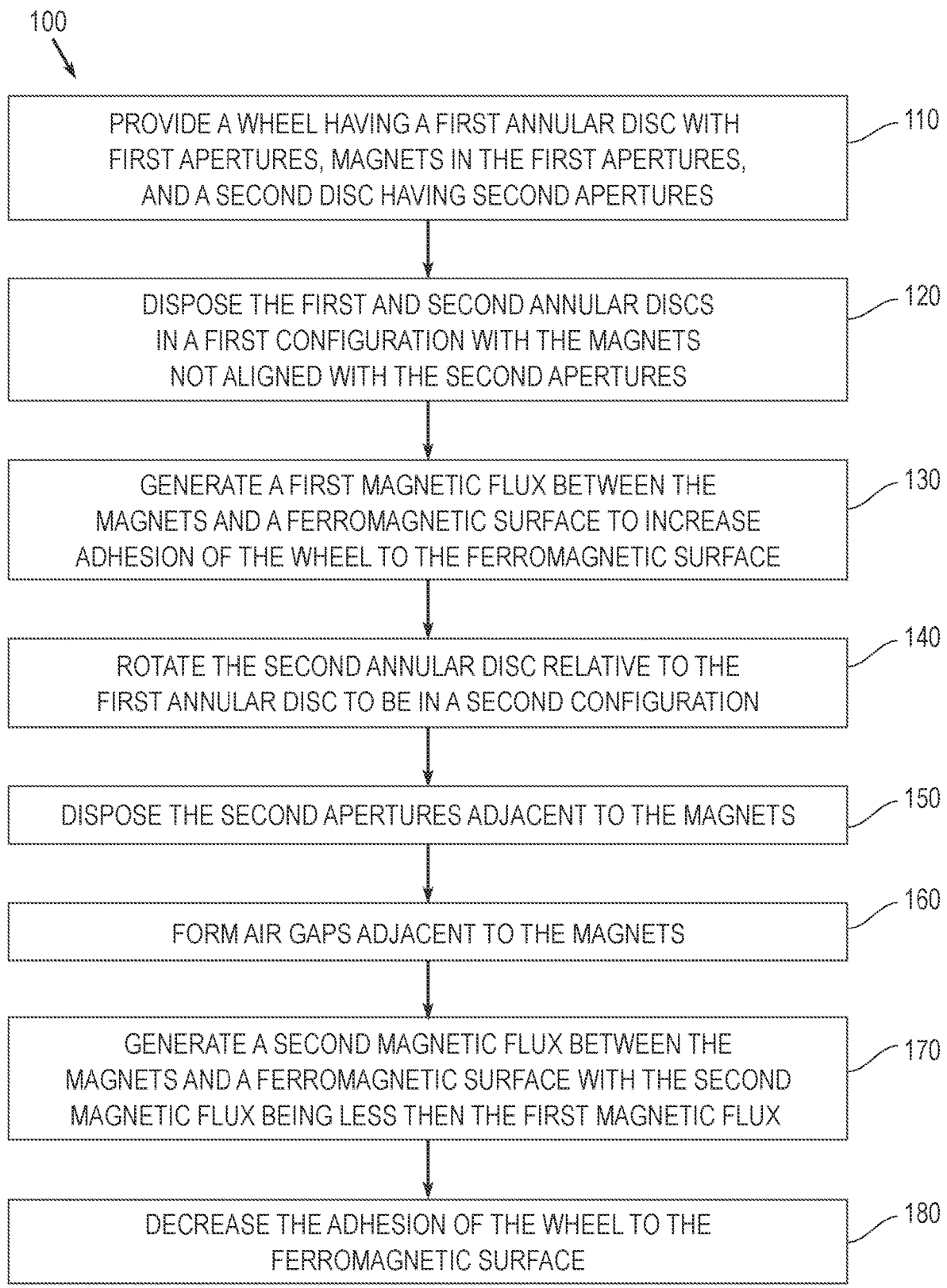
FIG. 14 is a flowchart of the method of operation of the wheel of FIG. 1.

As shown in FIG. 14, a method 100 includes the step of providing the wheel 10 in step 110, with the wheel 10 having a first annular disc with first apertures retaining magnets, and having a second annular disc with second apertures. The method 100 then disposes the first and second annular discs in a first configuration in step 120 with the magnets not aligned with the second apertures. The method 100 then generates a first magnetic flux between the magnets and a ferromagnetic surface in step 130 to increase the adhesion of the wheel to the ferromagnetic surface. The method 100 then rotates the second annular disc relative to the first annular disc to be in a second configuration in step 140, and disposes the second apertures adjacent to the magnets in step 150. The method 100 then forms air gaps adjacent to the magnets in step 160, and generates a second magnetic flux between the magnets and the ferromagnetic surface in step 170, with the second magnetic flux being less than the first magnetic flux. The method 100 then decreases the adhesion of the wheel to the ferromagnetic surface in step 180.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A wheel configured to adhere magnetically to a ferromagnetic surface, comprising:
    an inner annular disc composed of a non-magnetic material and having:
        a first plurality of apertures configured to retain a plurality of magnets; and
    a pair of outer annular discs composed of a ferromagnetic material and disposed on either side of the inner annular disc, with each outer annular disc of the pair of outer annular discs having:
        a second plurality of apertures;
    wherein in a first configuration, the second plurality of apertures are not aligned with the magnets, thereby generating a first magnetic flux between the plurality of magnets and the ferromagnetic surface to increase the adhesion of the wheel to the ferromagnetic surface, and
    wherein in a second configuration, at least one outer annular disc of the pair of outer annular discs is rotated relative to the inner annular disc to align the second plurality of apertures with the magnets, thereby generating a second magnetic flux between the plurality of magnets and the ferromagnetic surface to decrease the adhesion of the wheel to the ferromagnetic surface,
    wherein the second magnetic flux is less than the first magnetic flux.

2. The wheel of claim 1, wherein in the second configuration, the alignment of the second plurality of apertures with the magnets forms a plurality of air gaps adjacent to the magnets.

3. The wheel of claim 2, wherein the plurality of air gaps block at least a portion of the second magnetic flux.

4. The wheel of claim 1, wherein the plurality of magnets are permanent magnets.

5. The wheel of claim 1, wherein the plurality of magnets are electromagnets.

6. The wheel of claim 1, wherein the first and second pluralities of apertures are cylindrical.

7. The wheel of claim 6, wherein the plurality of magnets are cylindrical.

8. A wheel configured to adhere magnetically to a ferromagnetic surface, comprising:
   a first annular disc composed of a non-magnetic material and having:
      a first plurality of apertures configured to retain a plurality of magnets; and
   a second annular disc composed of a ferromagnetic material and disposed on a side of the first annular disc, with the second annular disc having:
      a second plurality of apertures;
   wherein in a first configuration, the second plurality of apertures are not aligned with the magnets, thereby generating a first magnetic flux between the plurality of magnets and the ferromagnetic surface to increase the adhesion of the wheel to the ferromagnetic surface, and
   wherein in a second configuration, the second annular disc is rotated relative to the first annular disc to align the second plurality of apertures with the magnets, thereby generating a second magnetic flux between the plurality of magnets and the ferromagnetic surface to decrease the adhesion of the wheel to the ferromagnetic surface,
   wherein the second magnetic flux is less than the first magnetic flux.

9. The wheel of claim 8, wherein in the second configuration, the alignment of the second plurality of apertures with the magnets forms a plurality of air gaps adjacent to the magnets.

10. The wheel of claim 9, wherein the plurality of air gaps block at least a portion of the second magnetic flux.

11. The wheel of claim 8, wherein the plurality of magnets are permanent magnets.

12. The wheel of claim 8, wherein the plurality of magnets are electromagnets.

13. The wheel of claim 8, wherein the first and second pluralities of apertures are cylindrical.

14. The wheel of claim 13, wherein the plurality of magnets are cylindrical.

15. A method of adhering a wheel magnetically to a ferromagnetic surface, comprising:
   providing a wheel having a first annular disc and a second annular disc, wherein the first annular disc is composed of a non-magnetic material and has a first plurality of apertures and is configured to retain a first plurality of magnets, and wherein the second annular disc is composed of a ferromagnetic material and is disposed on one side of the first annular disc, with the second annular disc having a second plurality of apertures;
   disposing the first and second annular discs in a first configuration wherein the second plurality of apertures are not aligned with the magnets;
   generating a first magnetic flux between the plurality of magnets and the ferromagnetic surface; and
   increasing the adhesion of the wheel to the ferromagnetic surface.

16. The method of claim 15, further comprising:
   disposing the first and second annular discs in a second configuration wherein the second plurality of apertures are aligned with the magnets;
   defining a plurality of air gaps adjacent to the plurality of magnets;
   generating a second magnetic flux between the plurality of magnets and the ferromagnetic surface; and
   decreasing the adhesion of the wheel to the ferromagnetic surface,
   wherein the second magnetic flux is less than the first magnetic flux.

17. The method of claim 15, wherein the plurality of magnets are permanent magnets.

18. The method of claim 15, wherein the plurality of magnets are electromagnets.

19. The method of claim 15, wherein the plurality of magnets are cylindrical.

20. The method of claim 19, wherein the first and second pluralities of apertures are cylindrical.

* * * * *